US 7,945,660 B2

(12) United States Patent
Goyal et al.

(10) Patent No.: US 7,945,660 B2
(45) Date of Patent: May 17, 2011

(54) TIME SLICING WEB BASED ADVERTISEMENTS

(75) Inventors: Prabhakar Goyal, Mountain View, CA (US); Jatin Patel, Cupertino, CA (US); Sam Hamilton, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 955 days.

(21) Appl. No.: 11/493,213

(22) Filed: Jul. 26, 2006

(65) Prior Publication Data

US 2008/0028064 A1    Jan. 31, 2008

(51) Int. Cl.
G06F 15/173 (2006.01)
G06Q 30/00 (2006.01)

(52) U.S. Cl. ..................... 709/224; 705/14.4
(58) Field of Classification Search ............ 705/10–15; 709/224; 370/240–477
See application file for complete search history.

(56) References Cited

U.S. PATENT DOCUMENTS

| 6,009,409 | A | 12/1999 | Adler et al. |
|---|---|---|---|
| 6,026,368 | A | 2/2000 | Brown et al. |
| 6,119,098 | A * | 9/2000 | Guyot et al. ............... 705/14 |
| 6,401,075 | B1 | 6/2002 | Mason et al. |
| 6,519,639 | B1 * | 2/2003 | Glasser et al. ............. 709/224 |
| 6,714,975 | B1 | 3/2004 | Aggarwal et al. |
| 6,804,659 | B1 * | 10/2004 | Graham et al. ............ 705/14.49 |
| 6,826,572 | B2 | 11/2004 | Colace et al. |
| 6,907,566 | B1 | 6/2005 | McElfresh et al. |
| 7,043,483 | B2 | 5/2006 | Colace et al. |
| 7,225,142 | B1 * | 5/2007 | Apte et al. ............... 705/14.39 |
| 7,310,609 | B2 * | 12/2007 | Middleton et al. .......... 705/14 |
| 7,353,229 | B2 * | 4/2008 | Vilcauskas et al. ......... 719/318 |
| 7,386,555 | B2 * | 6/2008 | Vilcauskas et al. ............ 1/1 |
| 7,546,625 | B1 * | 6/2009 | Kamangar .................. 725/93 |
| 7,668,748 | B1 * | 2/2010 | Veach ................... 705/14.69 |
| 2001/0047294 | A1 * | 11/2001 | Rothschild ................. 705/14 |
| 2002/0077900 | A1 * | 6/2002 | Thompson et al. ......... 705/14 |
| 2003/0014304 | A1 * | 1/2003 | Calvert et al. ............. 705/14 |
| 2003/0046148 | A1 * | 3/2003 | Rizzi et al. ............... 705/14 |
| 2003/0046161 | A1 | 3/2003 | Kamangar et al. |
| 2003/0074661 | A1 * | 4/2003 | Krapf et al. .............. 725/34 |
| 2003/0149938 | A1 | 8/2003 | McElfresh et al. |
| 2004/0093327 | A1 | 5/2004 | Anderson et al. |
| 2004/0107137 | A1 * | 6/2004 | Skinner ................... 705/14 |
| 2004/0186776 | A1 | 9/2004 | Llach |
| 2004/0192351 | A1 * | 9/2004 | Duncan ................ 455/456.3 |
| 2004/0193488 | A1 * | 9/2004 | Khoo et al. ............... 705/14 |
| 2004/0204997 | A1 * | 10/2004 | Blaser et al. ............... 705/14 |
| 2005/0010477 | A1 | 1/2005 | Sullivan et al. |
| 2005/0028188 | A1 * | 2/2005 | Latona et al. ............. 725/13 |
| 2005/0071214 | A1 * | 3/2005 | Kover et al. ............... 705/10 |
| 2005/0149388 | A1 * | 7/2005 | Scholl .................... 705/14 |
| 2005/0154746 | A1 | 7/2005 | Liu et al. |
| 2005/0283464 | A1 * | 12/2005 | Allsup et al. .............. 707/3 |
| 2006/0004732 | A1 * | 1/2006 | Odom .................... 707/3 |

(Continued)

*Primary Examiner* — Carl Colin
*Assistant Examiner* — Catherine Thiaw
(74) *Attorney, Agent, or Firm* — Brinks Hofer Gilson & Lione (57) ABSTRACT

A system and method are disclosed for rotating an advertisement on a single page or screen. The advertisement may be rotated when the user is active on the page or screen. In addition, the advertisement that replaces the original ad may be based on the user's activity, or may be based on the content displayed in the page or screen. This system and method may increase advertising inventory that is displayed on a page or screen by displaying advertisements for a set time interval, which results in increased flexibility for sellers and buyers of online advertising.

17 Claims, 10 Drawing Sheets

U.S. PATENT DOCUMENTS

| | | |
|---|---|---|
| 2006/0031419 A1* | 2/2006 | Huat .............................. 709/219 |
| 2006/0059042 A1* | 3/2006 | Zohar ............................. 705/14 |
| 2006/0167747 A1* | 7/2006 | Goodman et al. .............. 705/14 |
| 2006/0235938 A1* | 10/2006 | Pennell et al. ................ 709/217 |
| 2006/0271425 A1* | 11/2006 | Goodman et al. .............. 705/14 |
| 2007/0027743 A1* | 2/2007 | Carson et al. ................... 705/10 |
| 2007/0073585 A1* | 3/2007 | Apple et al. .................... 705/14 |
| 2007/0150573 A1* | 6/2007 | Kitchen ........................ 709/223 |
| 2007/0219859 A1* | 9/2007 | Huntington ..................... 705/14 |
| 2007/0260512 A1* | 11/2007 | Sattley et al. ................... 705/14 |
| 2007/0265090 A1* | 11/2007 | Barsness et al. ................ 463/42 |
| 2008/0010130 A1* | 1/2008 | Pyhalammi et al. ............ 705/14 |
| 2008/0089880 A1* | 4/2008 | Austin et al. ............... 424/94.64 |
| 2008/0275755 A1* | 11/2008 | Brustein et al. ................. 705/10 |

* cited by examiner

TIME SLICING WEB BASED ADVERTISEMENTS

TECHNICAL FIELD

The present embodiments relate generally to the display of advertisements on various pages or screens, such as websites.

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. An advertisement can be selected for display each time the page is requested, for example, by a browser or server application.

Traditional media (television, radio) ads are sold based on a time interval (15 sec, 30 sec, 1 min, etc.). A single programming break may contain multiple advertisements divided into this time interval. The advertisers pay for each advertisement based on the length of the time interval the advertisement occupies. Conversely, online advertisements are typically sold based on a set price or a bid and are displayed once in a web page. Most web pages are static, so a reload of the existing page or the loading of a new page may be necessary to get new content within the page. Each reload of a page is counted as a separate page view. Therefore, if the same web page is reopened or reloaded, a different advertisement may be displayed. Advertisements on each page reload are counted as new ad impressions and are billable.

A page that is opened for viewing without reloading displays the same advertisement. With the contents of a page static, a user is generally expected to spend a relatively short period of time per page view. New advertisements are only displayed after a reload or refresh of a page. Therefore, the advertisements that are displayed are present until a reload, refresh, or opening of a new page.

There has been a shift in terms of how contents are delivered via the web. Pages are becoming increasingly interactive. Interactive technologies are having a very positive impact on the user experience while changing the way a user consumes contents. Users may now spend much longer on the same page without a page reload. Audio, video and other multimedia content are becoming more popular and accessible with increased network speeds. With these types of media user tends to spend more time on an otherwise static website. Accordingly, an advertising system that adapts to the change in user habits may be necessary.

SUMMARY

By way of introduction, the embodiments described below include a method and system for advertising. The embodiments relate to a system and method for displaying an advertisement within a page or screen for a set amount of time and then replacing that advertisement after the time period has passed. This advertisement rotation may occur within each advertising slot on a page or screen.

In a first aspect, a method is disclosed displaying advertisements on a single page. A first advertisement is displayed within the page. User activity is then measured within the page and the first advertisement is replaced with a second advertisement on the page when the user is active on the page.

In a second aspect, a computer readable storage medium is disclosed having stored therein data representing instructions executable by a programmed processor for rotating an advertisement within a single page. The storage medium includes instructions for displaying a first advertisement within the page. A time period the first advertisement is displayed is measured and user activity is monitored. The first advertisement may be replaced with a second advertisement when the time period equals a predetermined value and when user activity is measured.

In a third aspect, a method is disclosed for providing advertisements to be displayed on a single page. The method includes transmitting data over a network, wherein the data includes the page. A first advertisement is provided and configured to be displayed on the page. Interaction with the page is determined. A second advertisement is provided and configured to be displayed in place of the first advertisement on the page when there is interaction.

In a fourth aspect, a system displays a page with an advertisement. The system includes a network and a processor configured to be connected with the network. A user interface is coupled with the processor and configured to receive input. A display is coupled with the processor. A browser is coupled with the processor and configured to display, on the display, data received over the network, the data including a page with a first advertisement. The first advertisement is replaced by a second advertisement within the page when input is received.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

The principles described herein may be embodied in many different forms. The embodiments relate to a system and method for rotating an advertisement on a single page or screen. The advertisement may be rotated when the user is active on the page or screen. In addition, the advertisement that replaces the original ad may be based on the user's activity, or may be based on the content displayed in the page or screen. This system and method may increase advertising inventory that is displayed on a page or screen by displaying advertisements for a set time interval, which may result in increased flexibility for sellers and buyers of online advertising.

Figure 1:
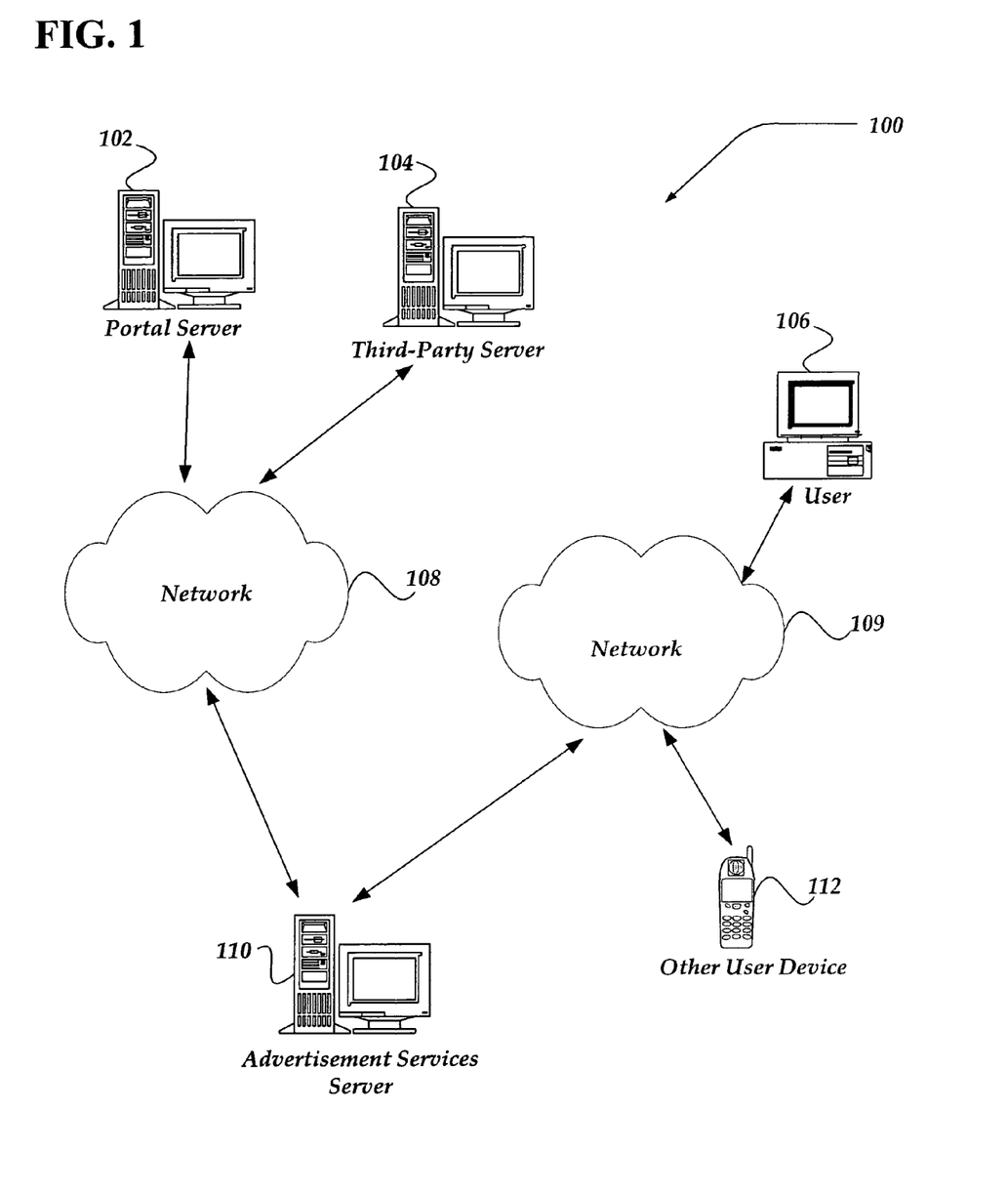
FIG. 1 provides a simplified view of one embodiment of an operating environment.

FIG. 1 provides a simplified view of a network environment 100. Not all of the depicted components may be required, however, and some embodiments of the invention may include additional components not shown in the figure. Variations in the arrangement and type of the components may be made without departing from the spirit or scope of the claims as set forth herein. Additional, different or fewer components may be provided.

In FIG. 1, environment 100 includes an advertisement services server 110, which may provide a platform for selection, optimization, and/or distribution of advertisements for inclusion in pages, such as web pages (e.g. FIG. 3, 8-11). Pages may be provided to users by a portal server 104 and/or a third-party server 102. In FIG. 1, users are represented by a user device 106, depicted as a conventional personal computer, and/or other device such as a mobile user device 112, including a network-enabled mobile phone, personal digital assistant (PDA), pager, network-enabled television, digital video recorder, such as TIVO®, and/or automobile.

Some or all of advertisement services server 110, portal server 104, and third-party server 102 may be in communication with each other by way of network 108. The advertisement services server 110 and portal server 104 may each represent multiple linked computing devices, and multiple third-party servers, such as third-party server 102, may be included in environment 100. Network 108 may be regarded as a public or private network connection and may include, for example, a virtual private network or an encryption or other security mechanism employed over the public Internet, or the like.

User device 106 and mobile user device 112 are represented by user-interactive devices that typically run browser applications, and the like, to display requested pages received over a network. The user may be a consumer of goods of services that is searching for a business such as a business of the advertiser. Such devices are in communication with portal server 104 and/or third-party server 102 by way of network 109. Network 109 may include the Internet and may include all or part of network 108; network 108 may include all or part of network 109. Network 109 is discussed below relating to FIG. 2.

Portal server 104, third-party server 102, advertisement services server 110, user device 106, and mobile user device 112 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 104 or third-party server 102.

Networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. Networks 108, 109 may include any communication method by which information may travel between computing devices. The advertisement services server 110 may be used for providing advertisements that are displayed to users 106.

Figure 2:
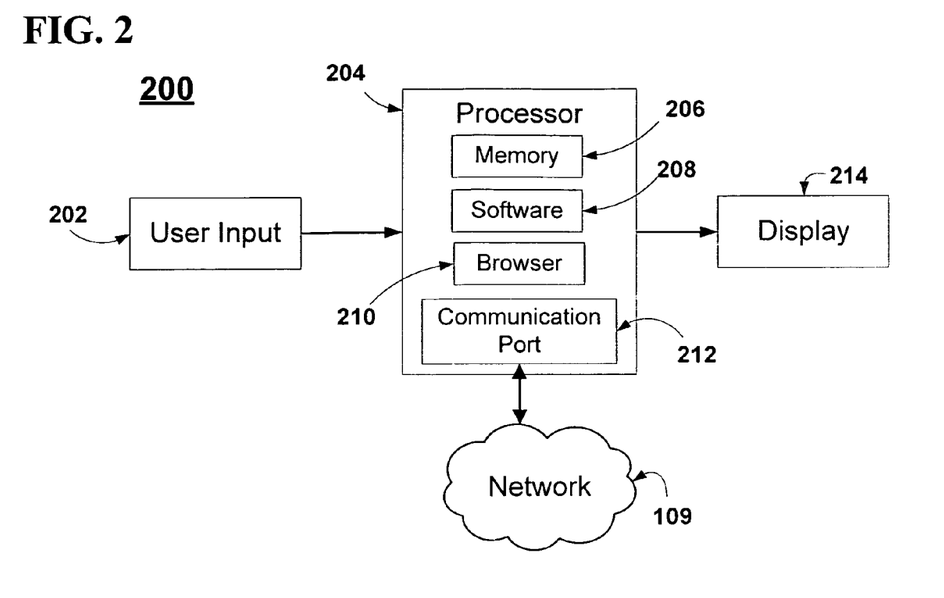
FIG. 2 is a block diagram of an exemplary user system.

FIG. 2 is a block diagram of an exemplary user system. System 200 may represent one embodiment of a user 106 as shown in FIG. 1. System 200 includes a user input 202 coupled with a processor 204. The processor is further coupled with a display 214. The processor may include or be coupled with memory 206, software 208, a browser 210, and a communication port 212. The communication port 212 couples the processor 204 with the network 109. System 200, and particularly the software 208 or browser 210 may be configured to receive advertisements from the network 109. Variations in the arrangement and type of the components may be made without departing from the spirit or scope of the claims as set forth herein. Additional, different or fewer components may be provided.

The processor 204 may be a central processing unit (CPU), a graphics processing unit (GPU), digital signal processor (DSP) or other type of processing device. The processor 204 may be a component in a variety of systems. For example, the processor 204 may be part of a standard personal computer or a workstation. The processor 204 may be one or more general processors, digital signal processors, application specific integrated circuits, field programmable gate arrays, servers, networks, digital circuits, analog circuits, combinations thereof, or other now known or later developed devices for analyzing and processing data. The processor 204 may operate in conjunction with a software program, such as code generated manually (i.e., programmed).

The input device or user input 202 is coupled with the processor 204 and configured to allow a user to interact with any of the components of system 200. The input device 202 may include a keyboard, keypad or a cursor control device, such as a mouse, or a joystick, touch screen display, remote control or any other device operative to interact with the system 200.

The display 214 is coupled with the processor 204 and is configured to display an output from the processor 204. The display 214 may be a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 204, or specifically as an interface with the software 208 or browser 210 stored in the memory 206. The software 208 or the browser 210 that are in the display 214 may include advertisements which are visible to the user.

The processor 204 may include a memory 206, or the memory 206 may be a separate component. The communication port 212, software 208, and/or the browser 210 may be stored in memory 206. The memory 206 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 206 includes a random access memory for the processor 204. In alternative embodiments, the memory 206 is separate from the processor 204, such as a cache memory of a processor, the system memory, or other memory. The memory 206 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 206 is operable to store instructions executable by the processor 204. The functions, acts or tasks illustrated in the figures or described herein may be performed by the programmed processor 204 executing the instructions stored in the memory 206. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

In one embodiment, the software 208 and/or a browser 210 may be stored in memory 206. The processor 204 is configured to execute the software 208. The software 208 may include a browser 210. The browser 210 may be a web browser configured to display information and data retrieved from the Internet or other network. For example, the browser 210 may be INTERNET EXPLORER®, or some other web browser. The browser 210 is configured to receive and display advertisements to the user while providing various content.

The present disclosure contemplates a computer-readable medium that includes instructions or receives and executes instructions responsive to a propagated signal, so that a device connected to a network 109 can communicate voice, video, audio, images or any other data over the network 109. Further, the instructions may be transmitted or received over the network 109 via a communication port 212. The communication port 212 may be a part of the processor 204 or may be a separate component. The communication port 212 may be created in software or may be a physical connection in hardware. The communication port 212 is configured to connect with a network 109, external media, the display 214, or any other components in system 200, or combinations thereof. The connection with the network 109 may be a physical connection, such as a wired Ethernet connection or may be established wirelessly as discussed below. Likewise, the additional connections with other components of the system 200 may be physical connections or may be established wirelessly.

The network 109 may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network 109 may be a public network, such as the Internet, a private network, such as an intranet, or combinations thereof, and may utilize a variety of networking protocols now available or later developed including, but not limited to TCP/IP based networking protocols.

The system 200 may be a computer enabling a user to view web pages over the network 109, such as the Internet. In one embodiment, a user views a browser 210 containing data from the Internet. The data displayed on the browser may include advertisements. In an alternate embodiment, other software 208 programs may also display advertisements received over the network 109 or from a different source. The advertisements may be displayed as shown in FIG. 3.

Figure 3:
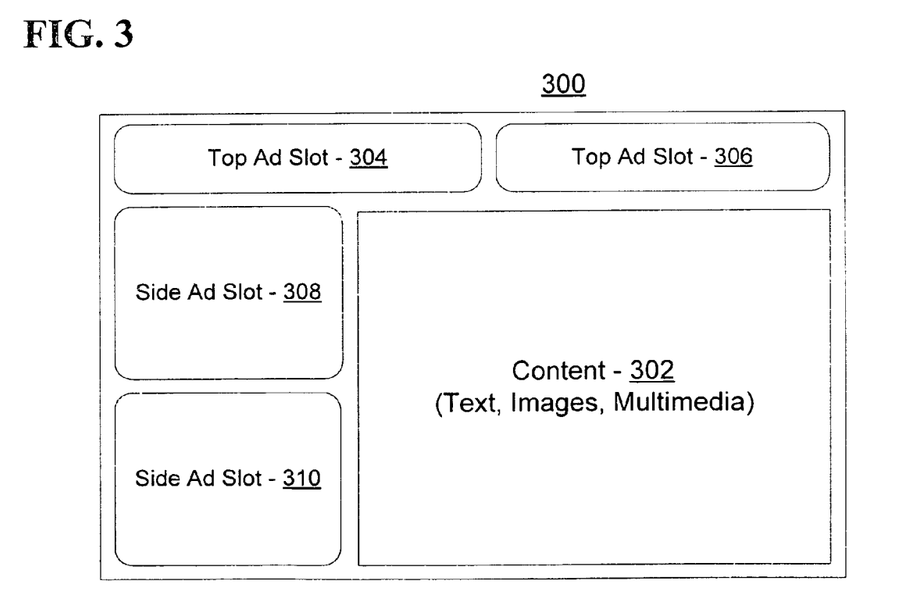
FIG. 3 is a block diagram of one embodiment of an exemplary page.

FIG. 3 is a block diagram of one embodiment of an exemplary screen 300. The screen may be a web page on the Internet, or may be a page or screen from any software program that is configured to display advertisements. FIG. 3 is an exemplary embodiment of a screen or page displaying advertisements. The page 302 is the content of the screen 300. Screen 300 may include multiple advertisements displayed around the main content 302. In one embodiment, there may be two top advertising slots 304, 306 for displaying advertisements at the top of the screen. Additionally, there may be two side advertising slots 308-310 displaying advertisement at the side of the screen. Advertisement slots may also be referred to as an advertising location or just an advertisement. FIG. 3 is merely exemplary of a screen or page displaying advertisements. The advertisements in any of the slots 304-310 may be rotated according to the embodiments discussed below.

Figure 4:
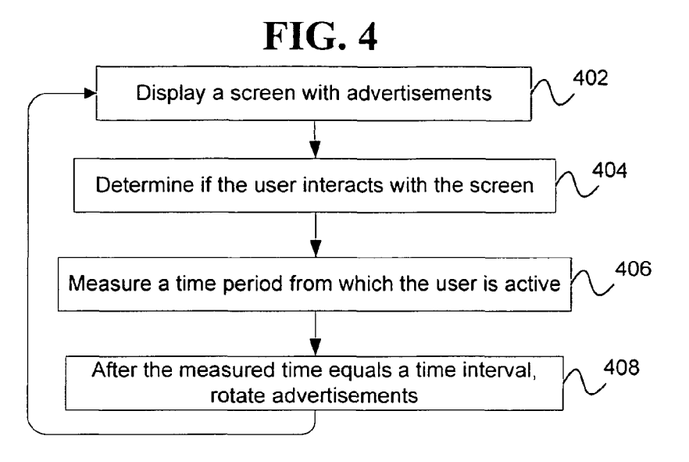
FIG. 4 is a flowchart depicting an embodiment of advertising on a page.
Figure 5:
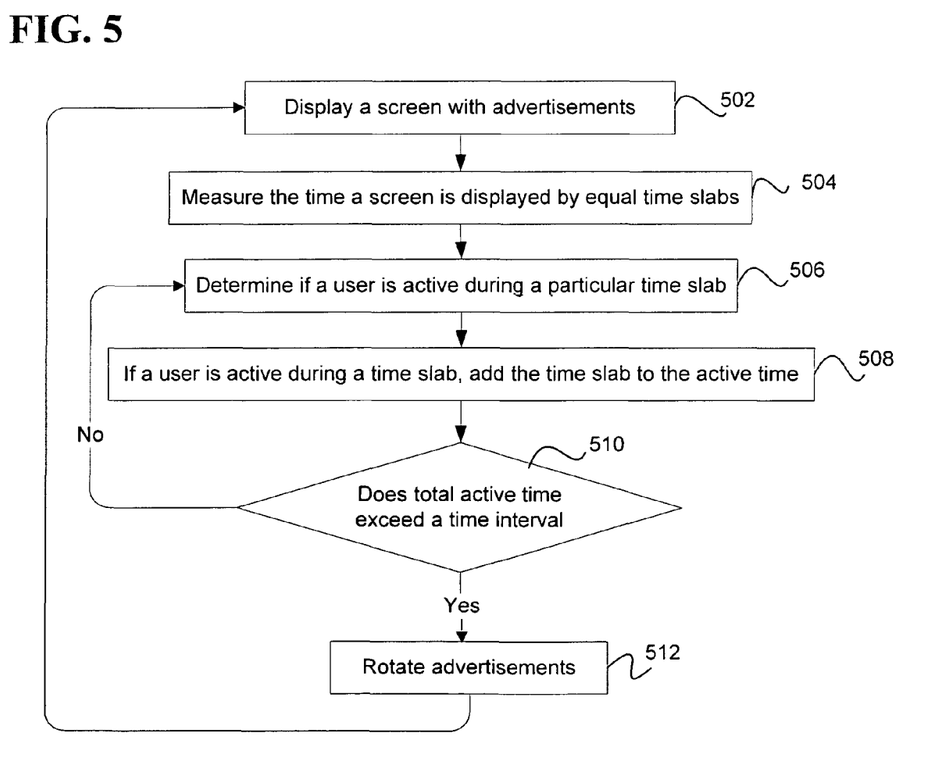
FIG. 5 is a flowchart depicting an alternate embodiment of advertising on a page.
Figure 6:
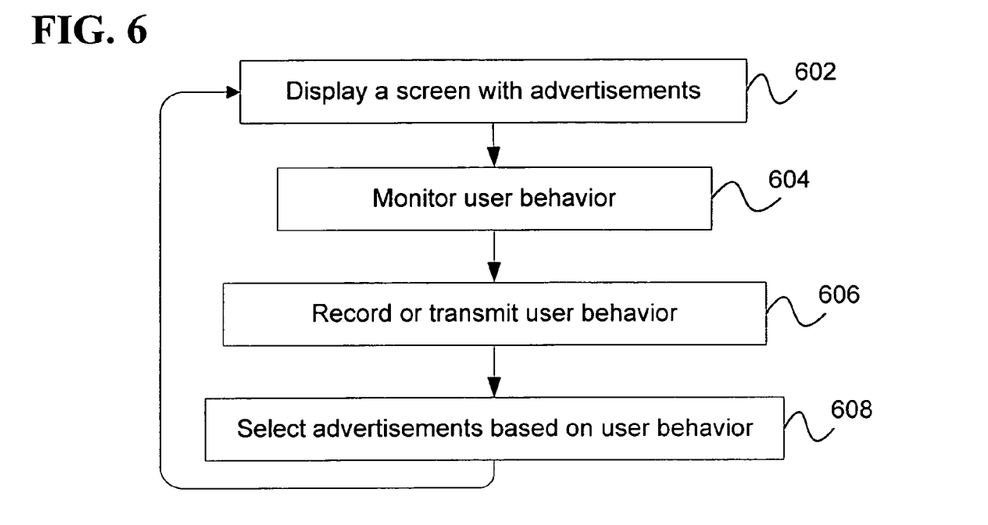
FIG. 6 is a flowchart depicting an embodiment for displaying advertisements.
Figure 7:
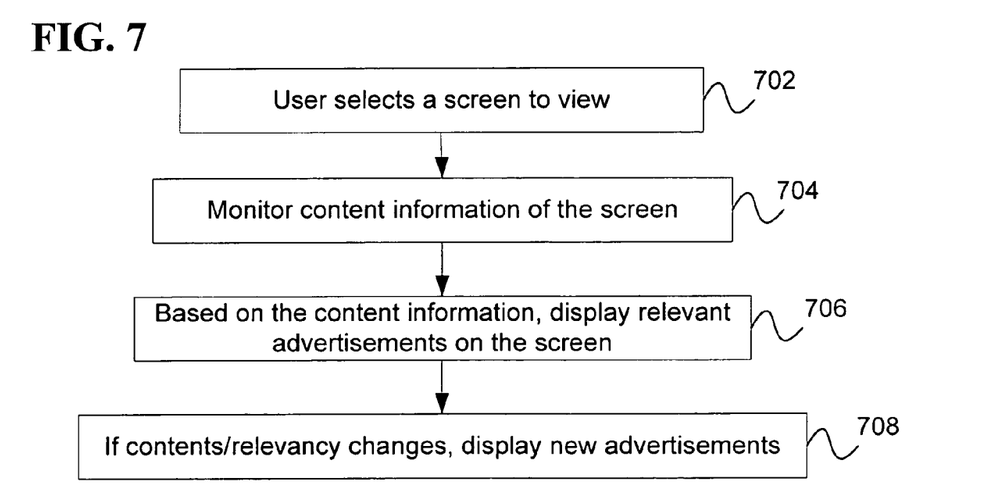
FIG. 7 is a flowchart depicting an alternate embodiment for displaying advertisements.
Figure 10:
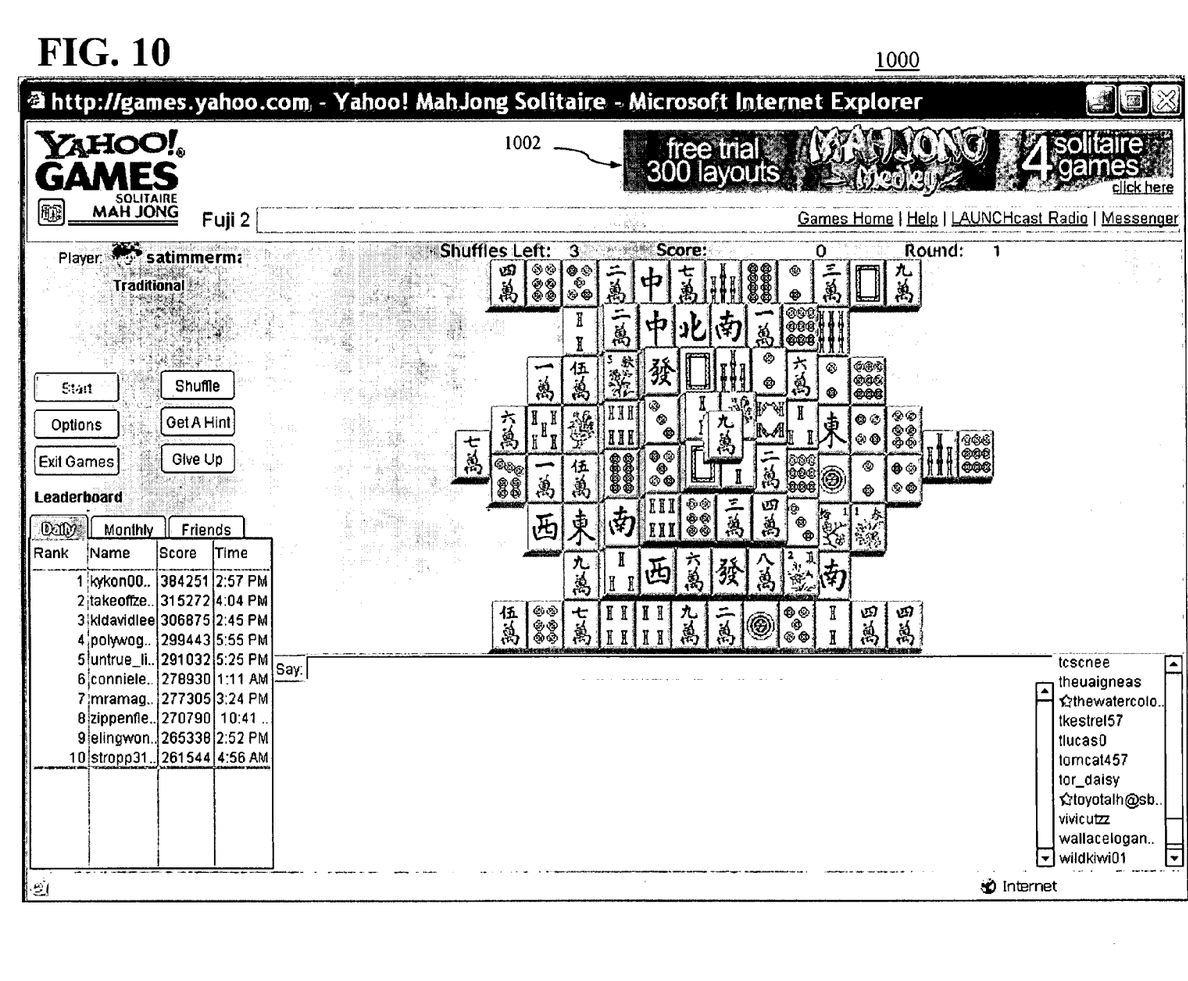
FIG. 10 is an illustration of an exemplary page.
Figure 11:
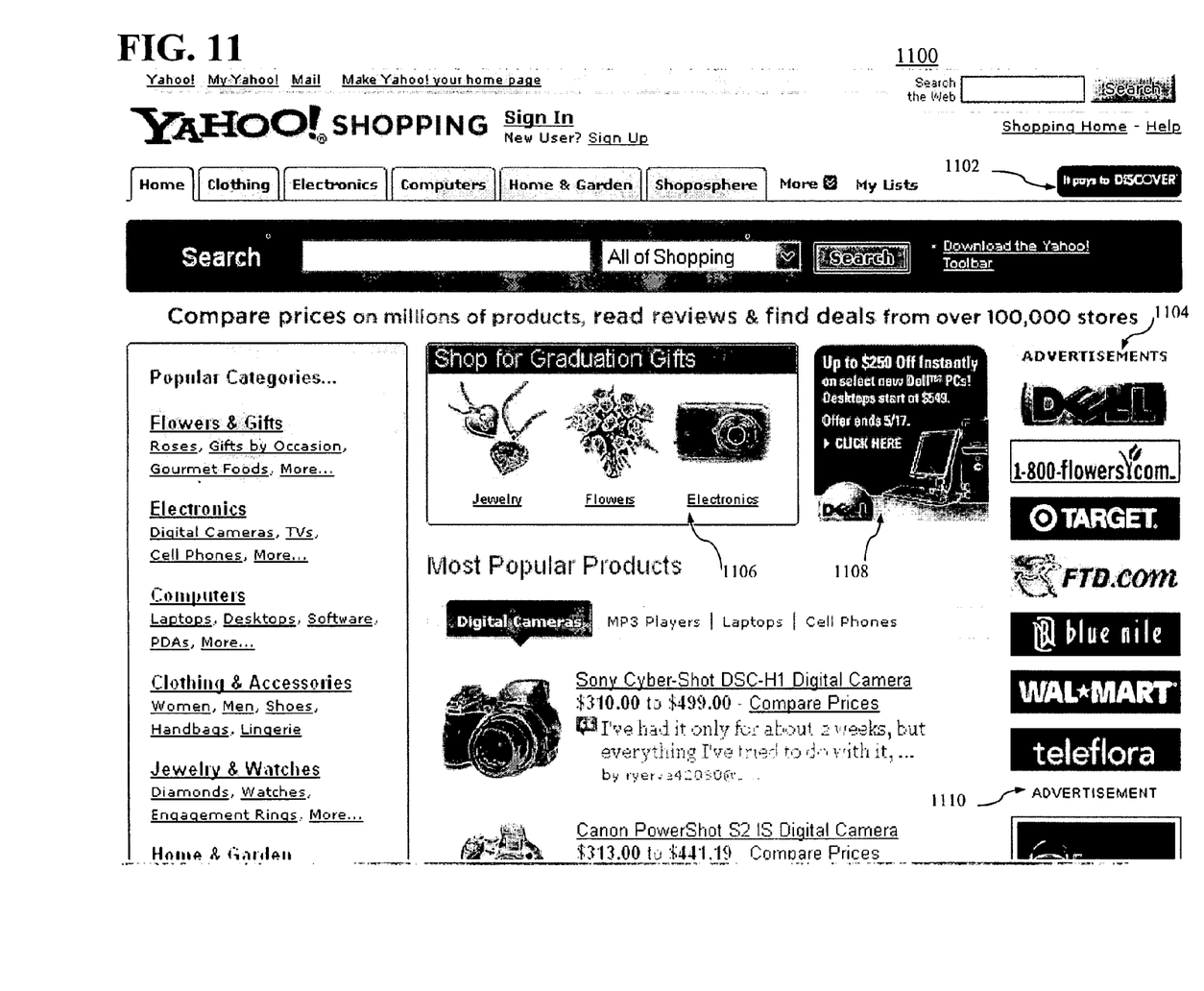
FIG. 11 is an illustration of an exemplary page.

Screen 300 may be a web page. Examples of web pages from the Internet are shown in FIGS. 8-11. For example, FIG. 11 is portion of a web page 1100 for shopping, which may be one embodiment of a screen 300 according to FIG. 3. Page 1100 allows a user to view, locate and purchase a variety of goods. The page 1100 displays multiple advertisements 1102-1110 throughout the page 1100. As will be described below, any of the advertisements 1102-1110 may be rotated while the user is viewing the page 1100. A shopping page 1100 may be one example of a page where a user spends more time than a typical page, therefore making rotation of ads particularly useful because the user may be exposed to multiple ads from each of the slots while not leaving the page 1100. FIGS. 4-5 illustrate rotation of the advertisements. FIGS. 6-7 illustrate that the advertisement rotated into the page may be based on user behavior or on the content of the web page. For example, in screen 1100, if a user shows an interest in a particular product by scrolling over information about that product or otherwise focusing on the information about that product, then the ad that is rotated into the page may be related to the product. Likewise, if a user is shopping for digital cameras and the content in screen 1100 is so related, then the new ad may be for a digital camera.

FIG. 4 is a flowchart depicting an embodiment of a process of advertising on a page. Specifically, FIG. 4 relates to the rotation of advertisements. In one embodiment, the method disclosed in FIG. 4 may include advertising on a screen 300 according to FIG. 3, which utilizes system 200 from FIG. 2 and FIG. 1. As discussed above, examples of the screen 300 may be embodied in FIGS. 8-11. The systems/apparatuses disclosed in FIGS. 1-3 may be utilized according to the method disclosed in FIG. 4. In one embodiment, FIG. 4 is performed by the processor 204 of a user device. In particular, the software 208, or browser 210 may display the screen as in described in the steps of FIG. 4.

In step 402, a screen is displayed with advertisements. As discussed above, the screen may be a website, or may be a software program configured to receive or display advertisements. In step 404, a determination is made as to whether a user interacts with the screen. In step 406, a time period is measured from which the user is active. Then in step 408, if the measured time period is equal to a predetermined time interval or period, the ad may be rotated.

In one embodiment according to FIG. 4, an advertisement is only rotated or replaced if the user is actively engaged with the screen or page as measured by user activity or user interaction. The user interaction is measured to determine whether to rotate or replace the advertisement displayed in step 402. Advertising regulations or other arrangements may require some form of evidence of a user's presence before an advertisement can be replaced or rotated. Step 404 allows for rotation of advertisements when a user is present. Accordingly, if a user is viewing a webpage and leaves that page displayed on a computer, but is in a different room, the user is not active and the advertisement is not visible to the user. In this example, the advertisement should not be rotated because the user is not actively viewing the screen with the advertisement. Step 404 may include a variety of embodiments of determining user activity/interaction with the screen or page. User activity or interaction may include any mouse movement, keyboard stroke, or any indication from any other device. Browser utilities to measure such interaction are well known to those of ordinary skill in the art. The interaction may include scrolling down a page or screen or merely moving the mouse cursor. The user activity is any determination that a user is viewing or was recently viewing the screen or interacting with the user input, processor, or display. Accordingly, any interaction with a user input 202 may signal user activity. If a user is active, then the advertisement may be rotated after a set amount of time as in step 408.

In one embodiment, the user activity may merely be the total time spent on the page. Alternatively, as discussed above, the user activity may be determined based on user interaction, so that rotation of an advertisement occurs after a measured amount of active time that the user spent on a page. Active time may be a measurement, which does not include time when a user is likely to be doing something else and may not engaged with the screen or page. The active time that a user spends on a page may be calculated and used according to the method in FIG. 5.

FIG. 5 is a flowchart depicting an embodiment of advertising on a page. In step 502, a screen is displayed with advertisements. In step 504, the time the screen is displayed is split into equal time slabs. For example, the time slabs may be periods of ten seconds. In step 506, user activity is measured in each of the time slabs. User activity may be measured as discussed above. In step 508, active time is measured by adding time slabs in which at least one user activity occurs within the time slab. For example, if in three consecutive ten second time slabs, a user is only active in two of them, then only those two "active" time slabs are considered within active time. A time interval is established to be the time for which an advertisement may be displayed before rotation. In step 510, if the active time equals or exceeds the time interval, then the advertisements may be rotated in step 512. The active time is the sum of all the active time slabs. As discussed above, if two ten second slabs are active, then the active time is 20 seconds. If the active time does not exceed the time interval, then more time slabs are monitored for user activity in step 506. The time interval may also be referred to as a time period, time limit, or predetermined time. The length of the time slabs and the length of the time interval can be varied according to individual embodiments and requirements. For example, a time slab may be less than a second long, or may be several minutes. Likewise, the time interval may be a few seconds to several minutes or hours.

According to one example of FIG. 5, a web page is displayed with an advertisement. The time interval for displaying the web page is 30 seconds and time slabs are defined to be 10 seconds. Once the page is loaded and the advertisement is displayed, the first time slab begins. If user activity is detected any time within the first 10 seconds of the first time slab, the 10 seconds of the time slab is considered active time. After 10 seconds, the second time slab begins. If no user activity is detected at any point during the 10 seconds of the second time slab, then that time is not considered part of the active time and the active time remains at 10 seconds. Assuming user activity is detected in time slab three and in time slab four, then the total active time is 30 seconds, which equals the time interval. Because the measured active time is equal to the time interval the advertisement may be rotated or replaced with a second advertisement. At this point, the process begins again and the first time slab of 10 seconds begins and user activity is measured to determine which time slabs are included in the active time. This is one embodiment of rotating advertisements within a page when considering user activity.

In alternate embodiments, the time slabs or time intervals may be any length of time. Alternatively, the measure of active time may be calculated with a different technique. In one embodiment, if the user is active within any point of the time interval, the advertisement is rotated after expiration of the time interval. Alternatively, the advertisement may be rotated without measuring active time or utilizing different mechanisms for monitoring user activity.

FIGS. 12-15 are example techniques that may be used to rotate ads as described above. In particular, FIGS. 12-15 illustrate the when an ad may be rotated. Each of FIGS. 12-15 illustrates the time on the x-axis in increments of 5 seconds. These figures are merely exemplary embodiments. The times that are shown may be in any unit, not just seconds as described herein.

Figure 12:
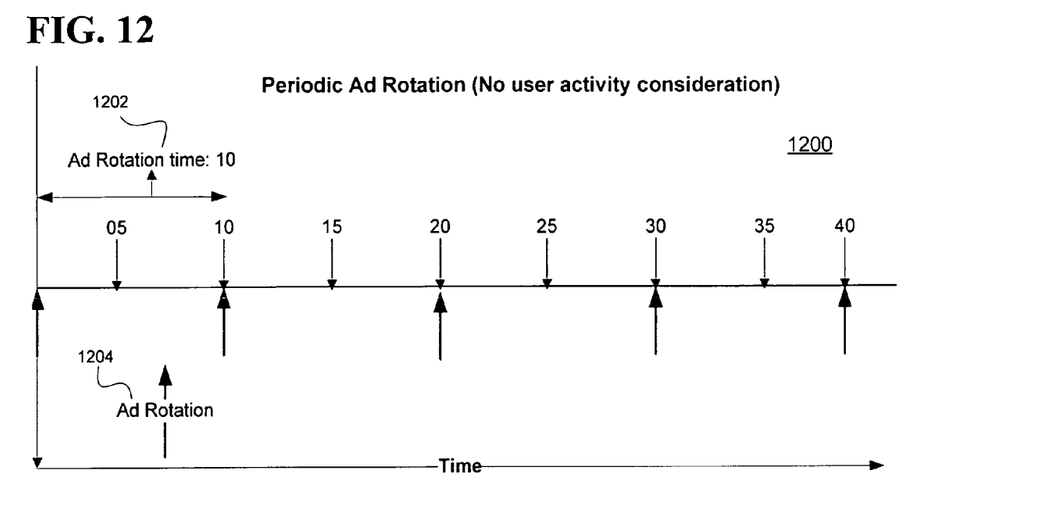
FIG. 12 is an illustration of an exemplary chart.

FIG. 12 illustrates periodic rotation in chart 1200. The ads are rotated every 10 seconds regardless of whether user activity is detected. According to this example, the ad rotation time 1202 is established as 10 seconds. Ad rotation arrow 1204 represents the times when an ad is rotated. As shown in the chart 1200, the ad is rotated every 10 seconds, so arrows 1204 are located at 0, 10, 20, 30, and 40 seconds.

Figure 13:
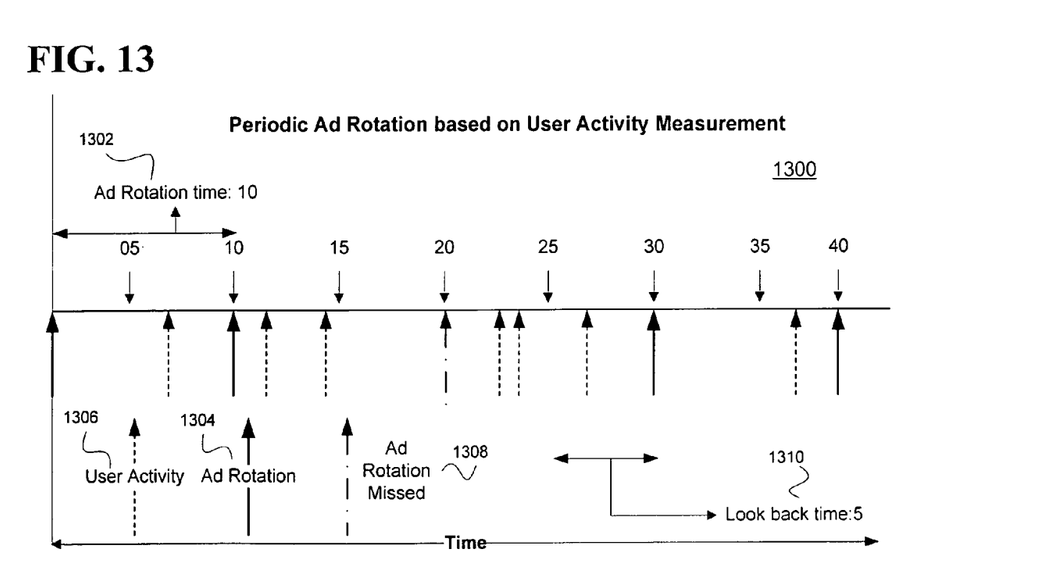
FIG. 13 is an illustration of an exemplary chart.

FIG. 13 illustrates periodic rotation based on user activity measurements in chart 1300. The ad rotation time 1302 is set at 10 seconds. The user activity 1306 is shown with a dashed arrow. The ad rotation 1304 is a solid arrow. The ad rotation missed 1308 is a dash and dot line. Chart 1300 shows an example in which the ads are only rotated if there was user activity within a predetermined time from the periodic rotations. In particular, there is a look back time 1310 that is 5 seconds. The ads may still rotate periodically every 10 seconds (ad rotation time 1302), but the rotation may only occur if there was user activity measured within the last 5 seconds (look back time 1310). Accordingly, at time 20, there was no user activity 1306 because in the previous 5 seconds (15-20) there was no user activity. Accordingly, an ad rotation is missed 1308 at time 20. At times 10, 30, and 40, there was user activity in the 5 seconds proceeding each of those times, so an ad rotation is still performed.

Figure 14:
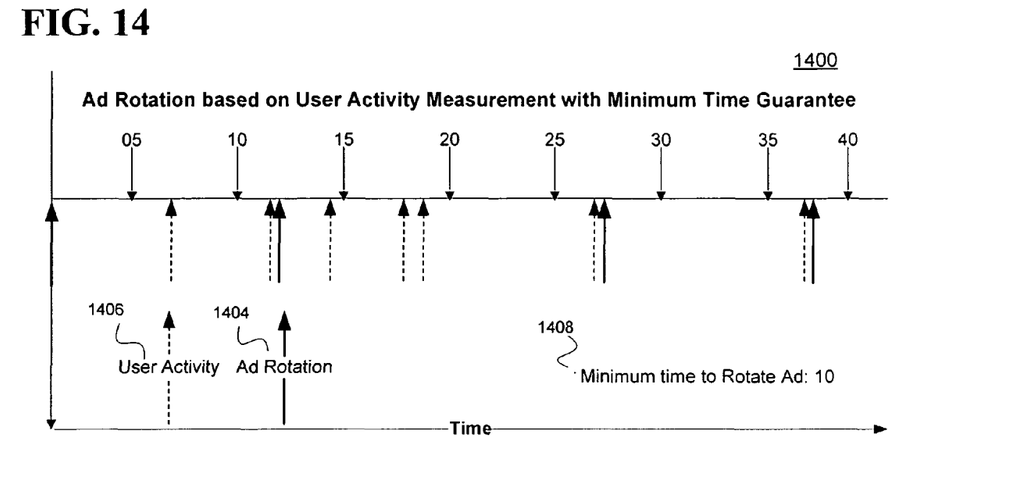
FIG. 14 is an illustration of an exemplary chart.

FIG. 14 illustrates ad rotation based on user activity measurement with a minimum time guarantee in chart 1400. In this example there is a minimum time in which an ad is rotated 1408 which is set to 10 seconds. This means that an ad is rotated less frequently than every 10 seconds, so each ad may be displayed for at least 10 seconds. Accordingly, after a rotation, the system waits for the minimum time and then after that time has elapsed, the next rotation comes almost immediately after the next user activity 1406. As shown in chart 1400, there is an ad rotation 1404 at approximately 12 seconds, which follows the first user activity 1406 after the minimum time from that last rotation. The last rotation was at time 0, so at time 10, the minimum time passed and the next rotation occurs after the next user activity. Following the rotation at time 12, the system waits 10 seconds, and the next user activity 1406 after time 22 is at approximately time 27 which is where the next rotation occurs. The next rotation is 10 seconds later because user activity is detected after the minimum at approximately time 37.

Figure 15:
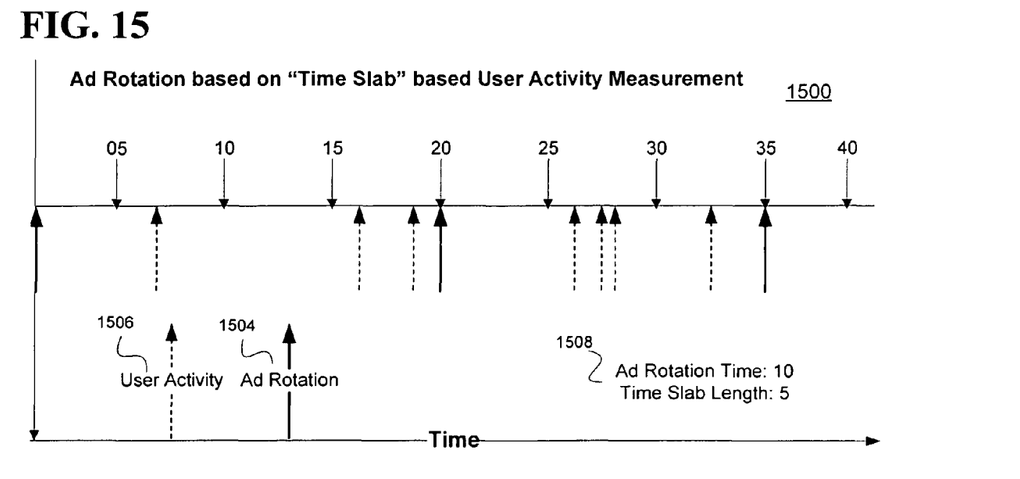
FIG. 15 is an illustration of an exemplary chart.

FIG. 15 illustrates ad rotation based on a time slab considering user activity measurements in chart 1500. In this example ad rotation time is 10 and the time slab length is 5 in 1508. A time slab example is discussed above. In chart 1500, the time slab of 5 seconds establishes a time period in which there should be measured user activity 1506 for the time slab to be counted against the ad rotation time of 10. In this example, because the ad rotation time is 10, there must be two time slabs that have user activity for a rotation to occur. There is no user activity between times 0 to 5 and times 10 to 15. There is user activity in times 5 to 10, which is one time slab and the second time slab is times 15 to 20. Accordingly, the ad is rotated at time 20 because the sum of the time slabs with user activity equals or exceeds the ad rotation time. Likewise, the next times slabs with user activity are times 25 to 30 and 30 to 35, so the ad is rotated at time 35.

The embodiments described above in FIGS. 12-15 are merely exemplary of the schemes that may be used for ad rotation. There may be other schemes that involve different timing and rotation techniques.

The measurement of user activity and time period as discussed above may be accomplished by the client library program which is installed on the user computer. The program may run as part of the user program responsible for displaying the content and ads on the user screen. The client library program is also responsible for determining the appropriate time to retrieve the ad based on user activity detection and time period configuration. It may also be responsible for retrieving the new ads and updating the new ads on the user screen. The client library may be written in any type of computer programming language. For a web browser based user display, common computer programming languages include JavaScript and flash ActionScript. Both of these languages provide a mechanism to detect various user activities, such as mouse movement or keyboard activity. The languages may also measure time, communicate to the external server programs via the network to retrieve new ads, and display new ads on the screen once they have been retrieved.

FIG. 6 is a flowchart depicting an embodiment of a process for displaying advertisements. Specifically, FIG. 6 relates to a process for selecting and displaying the advertisements that are rotated in to replace an existing advertisement. In step 602, a screen with advertisements is displayed. In step 604, user behavior may be monitored. For example, user behavior may include moving a mouse pointer over certain material or clicking on specific material. When the user's behavior suggests an interest in specific material, that material may be utilized in the next advertisements that are rotated. The user behavior is recorded or transmitted in step 606 and used to select advertisements in step 608. For example, if a user scrolls over an advertisement for a digital camera, then that user behavior may be used to select the next advertisement that is rotated in as discussed above. The next advertisement may then be related to a digital camera with a promotion/coupon as a way of targeting the specific user based on behavior. Any user behavior may be utilized in the selection of the next advertisement in the rotation. For example, an ad for a plasma television may be displayed after a user has played video related to the setting up of a home entertainment system from a page. As another example, an ad related to home mortgage may be shown after a user has read information using links on a page related to home financing.

FIG. 7 is a flowchart depicting an alternate embodiment for displaying advertisements. Specifically, FIG. 7 relates to displaying and rotating advertisements based on the content of the page or screen being viewed by the user. In step 702, the user selects a screen to view and the content on the screen is monitored in step 704. That screen may include specific content. For example, the user may be viewing a news article on personal computers. Therefore, the content of the page is personal computers. Accordingly, advertisements related to the content may be displayed on the screen according to step 706. In the example with personal computer content, the rotated advertisement may be related to a personal computer, such as a DELL® advertisement for the sale of a desktop computer. In step 708, the contents being modified or changed may result in a modification of the selection of a related advertisement. For example, if the specific content on flash memory from within the news article on the personal computer is displayed then the rotated advertisement that is selected may be related to flash memory rather than a personal computer. The content that a user views is monitored to determine the advertisements that are displayed in rotation.

FIGS. 8-11 are illustrations of exemplary pages, such as examples of the screen shown in FIG. 3. FIGS. 8-11 are examples of web pages, however, different pages or screens, other than web pages, may be included in the embodiments described herein.

Figure 8:
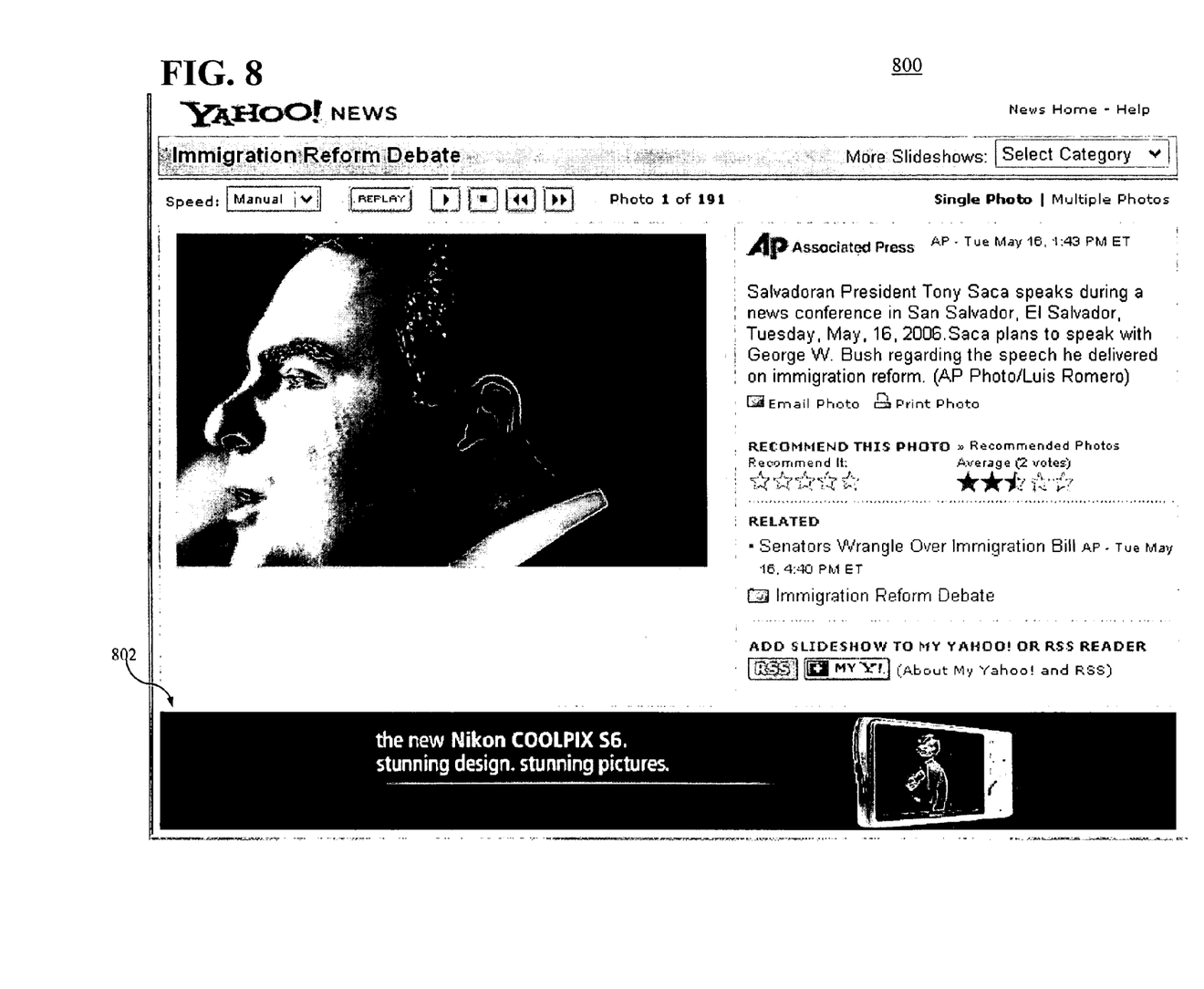
FIG. 8 is an illustration of an exemplary page.

FIG. 8 is a web page 800 displaying a slideshow. The user may view different slides within the same page 800. As shown, page 800 shows one advertisement slot 802. The ad shown in the advertisement slot 802 may be rotated. A user viewing an entire slideshow as in page 800 may be viewing the page for an extended period of time; therefore, rotation of advertisements may give the user additional impressions for multiple advertisements and increases advertising revenue for a page. An impression is an opportunity for a user to be subjected to an advertisement. Rotation of an advertisement within a page allows for multiple impressions, which may increase ad revenue. Any new advertisement 802 that replaces the current advertisement may be selected based on either user behavior or based on the content of the page 800 as discussed in FIGS. 6-7.

Figure 9:
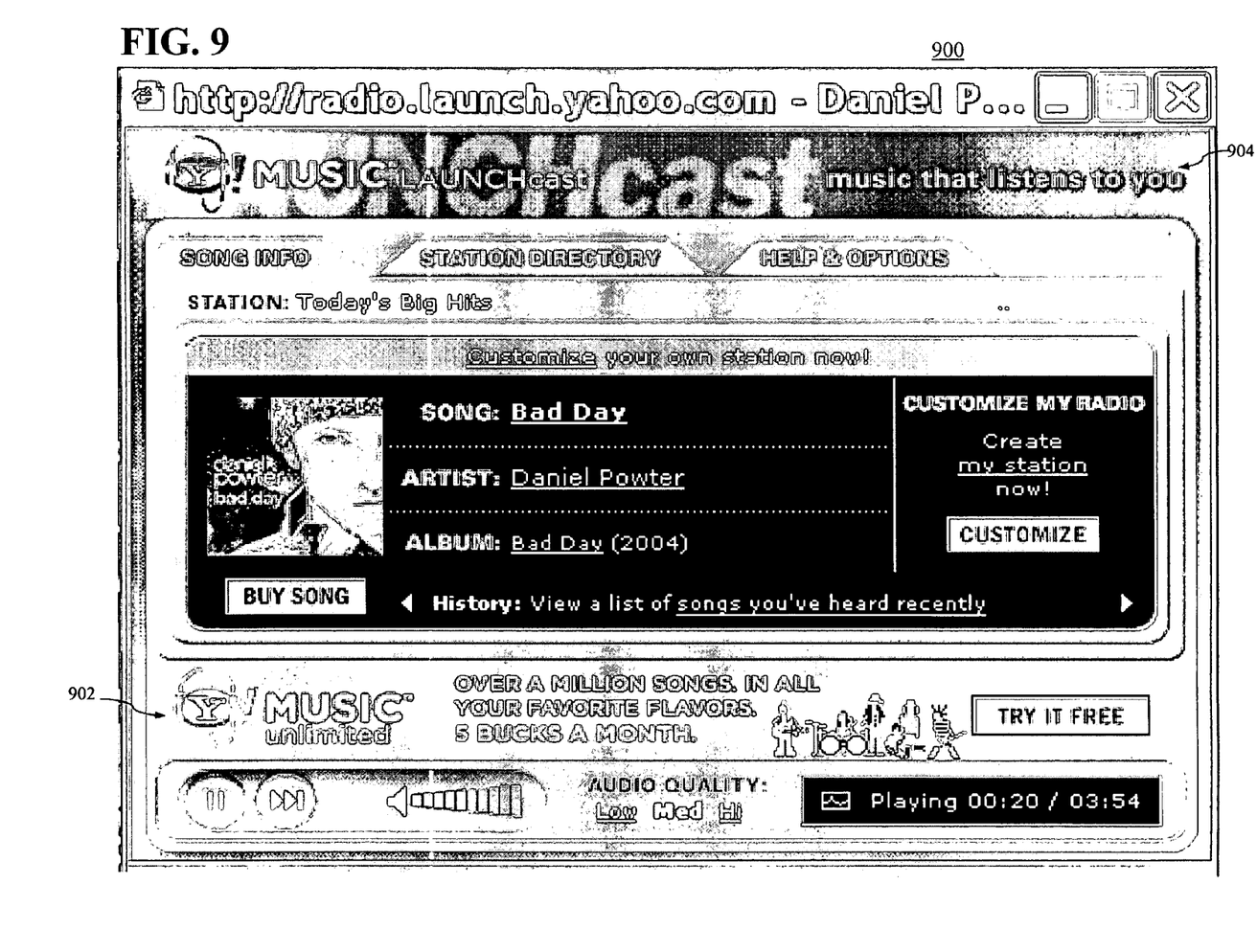
FIG. 9 is an illustration of an exemplary page.

FIG. 9 is a page or screen 900 representative of an audio player. The page 900 may be any multimedia viewer, but the example shown in FIG. 9 is a radio player. A user may select different radio stations or songs from within page 900, which includes two advertisement slots 902, 904 displayed within the page. FIG. 10 is a page or screen 1000 displaying a game. The page 1000 may be any video game or puzzle. The page 1000 includes an advertisement slot 1002. Both screens 900 and 1000 are representative of content that may be viewed for an extended period of time and may be subject to the rotation of advertisements to increase advertisement revenue. For example, if a user is on a single screen or page for 10 minutes, then it may be more lucrative to display 10 different ads that are rotated each minute. With ad rotation, ads may be sold for a particular time period and in a particular sequence. An advertiser may purchase the first 30 second ad for a high price, or may purchase the sixth 30 second ad for a low price. The price is lower for the sixth ad because not all users will view a page for the at least 150 seconds that take place before the sixth ad is rotated in. This method of displaying and selling an advertisement is similar to other forms of media, such as television, which sell advertisements based on time periods. As more media is used on the web, advertisements may be more interactive and include video, which may be utilized efficiently by rotating the video commercials rather than having one commercial displayed continuously.

In an alternate embodiment, advertisers could create a storyboard of advertisements that appear in sequence. For example, the advertiser may buy the first five time periods of advertisements and for each of the periods the advertisements that are displayed may all be related such that they tell a story or are otherwise connected. For example, the first ad may be designed to pique a user's interest, then a second ad would give the product name, the third ad would give the product's use, and the fourth and fifth ads describe the product and include a link for purchasing. This ability to storyboard advertisements within a single page or screen may result in more effective advertisements and greater flexibility in both buying and selling ads.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A method for displaying advertisements on a single page, the method comprising:
    displaying a first advertisement within the page on a display;
    measuring a passage of time after the first advertisement is displayed with a plurality of successive time slots, wherein each time slot includes a first time period that includes a portion of time at a beginning of a respective time slot, and a look back time period after the first time period, the look back time period including a portion of time at an end of the respective time slot;
    ignoring user activity within the page during the first time period of each respective time slot;
    monitoring whether there is user activity within the page after the first time period and during the look back time period of each respective time slot;
    determining, at the end of each of the successive time slots, whether there was any user activity within the page during the look back time period for the ending time slot;
    replacing, with a processor, the first advertisement with a second advertisement on the page when the determination indicates there was user activity within the page during the look back time period for the ending time slot;
    displaying the second advertisement within the page on the display when the second advertisement replaces the first advertisement; and
    continuing to display the first advertisement after the ending time slot when the determination indicates there was no user activity within the page during the look back time period for the ending time slot, wherein the determination of whether there was any interaction with the page continues for the successive time slot following the ending time slot.

2. The method according to claim 1 wherein the page is a web page displayed on a web browser and the first and second advertisements are displayed at the same location on the web page.

3. The method according to claim 1 wherein the user activity is determined based on a user interaction with the page, including interaction by a mouse movement, a keyboard activity, a joystick movement, or combinations thereof.

4. The method according to claim 1 further comprising:
measuring a passage of time after the second advertisement is displayed with a plurality of subsequent time slots, wherein each of the subsequent time slots includes a second time period that includes a portion of time at a beginning of a respective subsequent time slot, and a second look back time period after the second time period, the second look back time period including a portion of time at an end of the respective subsequent time slot;
monitoring whether there is user activity within the page after the second time period and during the second look back time period of each of the subsequent time slots;
determining, at the end of each of the subsequent time slots, whether there was any user activity within the page during the second look back time period for the ending subsequent time slot;
replacing the second advertisement with a third advertisement on the page when the determination indicates there was user activity within the page during the second look back time period for the ending subsequent time slot;
displaying the third advertisement within the page on the display.

5. The method according to claim 1 wherein the second advertisement is chosen based on content of the page.

6. The method according to claim 1 wherein the second advertisement is from the same advertiser and related to the first advertisement.

7. The method according to claim 6 wherein the second advertisement and the first advertisement are part of a series of advertisements displayed to convey a related message.

8. The method according to claim 7 wherein the series of advertisements displayed to convey a related message comprise a series of advertisements from one advertiser displayed to tell a story.

9. The method of claim 1, further comprising:
identifying a relationship between the user activity and content of the second advertisement; and
choosing the second advertisement to replace the first advertisement based on the relationship between the user activity and content of the second advertisement.

10. A non-transitory computer readable storage medium having a computer readable program code embodied therein, said computer readable program code adapted to be executed to implement a method for providing advertisements to be displayed on a single page, said method comprising:
transmitting data over a network, wherein the data includes the page;
providing a first advertisement configured to be displayed on the page;
measuring a passage of time after the first advertisement is displayed with a plurality of successive time slots, wherein each time slot includes a first time period that includes a portion of time at a beginning of a respective time slot, and a look back time period after the first time period, the look back time period including a portion of time at an end of the respective time slot;
ignoring user interaction with the page during the first time period of each respective time slot;
monitoring user interaction with the page after the first time period and during the look back time period of each respective time slot;
determining, at the end of each of the successive time slots, whether there was any interaction with the page during the look back time period for the ending time slot;
providing a second advertisement configured to be displayed in place of the first advertisement on the page when the determination indicates there was an interaction with the page during the look back time period for the ending time slot; and
continuing to provide the first advertisement after the ending time slot when the determination indicates there was no interaction with the page during the look back time period for the ending time slot, wherein the determination of whether there was any interaction with the page continues for the successive time slot following the ending time slot.

11. The non-transitory computer readable storage medium according to claim 10 wherein the providing a first advertisement comprises displaying the first advertisement, further wherein the providing a second advertisement comprises displaying the second advertisement.

12. The non-transitory computer readable storage medium according to claim 10 further comprising providing a different advertisement after each successive time slot when there was an interaction with the page during the look back time period for that successive time slot, wherein the different advertisement is not provided after an ending time slot when there was no interaction with the page during the look back time period for that ending time slot.

13. The non-transitory computer readable storage medium according to claim 10 wherein the second advertisement is selected based on the content of the page, the user activity, or combinations thereof.

14. A system displaying a page with advertising, the system comprising:
a processor configured to be connected with a network;
a user interface coupled with the processor and configured to receive input;
a display coupled with the processor; and
a browser coupled with the processor and configured to display, on the display, data received over the network, the data including a page with a first advertisement,
wherein the processor is configured to:
provide the first advertisement for display by the browser;
measure a passage of time after the first advertisement is displayed with a plurality of successive time slots, wherein each time slot includes a first time period that includes a portion of time at a beginning of a respective time slot, and a look back time period after the first time period, the look back time period including a portion of time at an end of the respective time slot;
ignore user interaction with the page during the first time period of each respective time slot;
monitor user interaction with the page after the first time period and during the look back time period of each respective time slot;
determine, at the end of each of the successive time slots, whether there was an interaction with the page during the look back time period for the ending time slot;
provide a second advertisement configured to be displayed in place of the first advertisement on the page when then determination indicates there was an interaction with the page during the look back time period for the ending time slot; and
continue to provide the first advertisement after the ending time slot when the determination indicates there was no interaction with the page during the look back time period for the ending time slot, wherein the determination of whether there was any interaction with the page continues for the successive time slot following the ending time slot.

15. The system according to claim 14 wherein the browser is stored in memory coupled with the processor.

16. The system according to claim 14 wherein the user interface includes a keyboard, a mouse, a joystick, or combinations thereof.

17. The system according to claim 16 wherein a user interaction is detected when input is received from the keyboard, the mouse, the joystick, or combinations thereof.

* * * * *